Patented Oct. 4, 1938

2,132,358

UNITED STATES PATENT OFFICE 2,132,358

BUTYL ALCOHOL FERMENTATION

David A. Legg and Milford T. Walton, Terre Haute, Ind., assignors to Commercial Solvents Corporation, Terre Haute, Ind., a corporation of Maryland No Drawing. Application November 30, 1936, Serial No. 113,436

9 Claims. (Cl. 195—46)

Our invention relates to the production of butyl alcohol by the fermentation of soluble carbohydrate mashes by means of the essentially sugar fermenting butyl alcohol producing bacteria. More specifically, our invention relates to the elimination of an adverse fermentation condition known as "sluggishness" in this type of fermentation.

It has previously been known that the fermentation of grain mashes by means of the essentially starch fermenting butyl alcohol producing bacteria is subject to an abnormal condition known as "sluggish fermentation" and that such condition is brought about by the presence of an ultramicroscopic agent which has been termed an ultravirus. It has also been known that the sluggishness in this fermentation could be prevented by immunizing the bacteria to the action of the ultravirus by a series of subcultivations in the presence of the ultravirus with elimination of the attenuated vegetative forms of the bacteria before each successive subcultivation.

We have now found that a somewhat similar condition may exist with respect to the butyl alcohol fermentation by means of the essentially sugar fermenting butyl alcohol producing bacteria. However, this condition differs from that encountered in the case of the essentially starch fermenting bacteria both in its form and in its treatment. In the case of the essentially starch-fermenting bacteria a single type of ultravirus apparently produces the sluggishness, and all species of this group of bacteria which are susceptible to sluggishness are susceptible to this particular virus. However, none of the species of the essentially sugar-fermenting bacteria appear to be susceptible to the virus which attacks the essentially starch-fermenting bacteria. Furthermore, each species of bacteria of the essentially sugar-fermenting class which is susceptible to sluggishness appears to be susceptible only to a specific virus, and even in the case of very closely related species the virus for one species will be inactive as to the other, and vice versa. The immunization process which we have found to be applicable to the bacteria of the essentially sugar-fermenting class differs from that employed in the case of the essentially starch-fermenting bacteria in that it is unnecessary, and usually undesirable, to remove the vegetative forms of the bacteria before each successive subcultivation.

The bacteria to which our invention is applicable comprises the butyl alcohol producing bacteria of the class which are capable of producing consistently higher yields of solvents from nutrient glucose mashes than from mashes consisting solely of grain meal and water. This class of bacteria is well known in the art and is contrasted with the essentially starch-fermenting bacteria, such as *Clostridium aceto-butylicum* Weizmann which was first used for the commercial production of butyl alcohol by fermentation. The essentially sugar-fermenting bacteria differ in their ability to attack sugars of varying structural complexity, some being capable of fermenting completely only the monose sugars, whereas others are capable of completely fermenting the disaccharides. Our invention is applicable to all such types of bacteria, it being understood, of course, that a suitable fermentable mash will be chosen for the specific type of bacteria employed. As examples of bacteria of this class there may be mentioned the *Clostridium propyl butylicum* group described in co-pending application Ser. No. 650,036 by J. Muller; the *Clostridium inverto acetobutylicum* group described in co-pending application Ser. No. 675,458 by D. A. Legg and H. R. Stiles, now Patent No. 2,089,562, issued August 10, 1937; the *Clostridium saccharo acetobutylicum* group described in co-pending application Ser No. 675,459 by J. C. Woodruff, H. R. Stiles, and D. A. Legg, now Patent No. 2,089,522, issued August 10, 1937; the beta and gamma species of the latter group described in U. S. Pat. No. 2,050,219 by C. F. Arzberger; *Clostridium saccharo butylicum* γ of U. S. Pat. No. 1,908,361; *Clostridium saccharo butyl-acetonicum* of U. S. Pat. No. 1,992,921. Various other species of this general group are well known to those skilled in the art.

The sluggishness which may be encountered when employing bacteria of the above class may manifest itself in the form of a very slow fermentation or in the form of a fermentation having a greatly delayed start after inoculation, but which may appear almost normal after finally starting. In either case a great loss of time ensues, which may also be accompanied by a diminished yield of the solvents. A characteristic of this fermentation condition is a prolonged acidity peak which tends to diminish the solvent yield.

The phenomenon of sluggishness may occur intermittently and for no apparent reason. It is usually epidemic in character and of sudden incidence. When sluggish fermentation is noticed in one or more of the vessels employed in a butyl fermentation plant it will frequently become apparent in numerous disconnected vessels within a very short time. It may be clearly shown that the phenomenon is not due to bacterial contamination. Pure cultures which have been stored for years in sealed tubes in the spore form, when transferred to and grown in a sterile mash, will often be found to be subject to sluggishness during an epidemic of this character. The phenomenon may best be explained on the theory that it is a "disease" of the butyl alcohol bacteria which is induced by contact with an ultramicroscopic principle which may be termed an ultravirus for want of a more precise definition. It may be shown that the slightest contact of any portion of a sluggish mash with another mash is sufficient to induce sluggishness. If a sample of sluggish fermenting mash is filtered to remove macroscopic solids and then filtered through a Berkefeld filter to remove bacteria, one drop of the filtrate placed in a flask of normally fermenting mash is sufficient to induce sluggishness. In fact, the drop of filtrate may be diluted a matter of a thousand times, and one drop of the resultant diluted liquid will often produce sluggishness in a flask of normally fermenting mash.

It may be further demonstrated that the sluggish principle may be propagated indefinitely by transferring the filtrate from a mash undergoing sluggish fermentation to fresh mash, fermenting the fresh mash, securing a filtrate of it, and repeating the cycle. Such transferring, although apparently diluting the original filtrate, does not produce dilution of the sluggish principle, since it appears in as virulent a form in the final mash as in the first. The sluggish principle may be destroyed or attenuated by heat, or by certain chemical reagents, but such treatments are usually sufficient to destroy or attenuate the bacteria at the same time.

Irrespective of the exact nature of the phenomenon termed sluggishness, we have discovered that the essentially sugar-fermenting butyl alcohol producing bacteria may be rendered resistant to epidemics of this character, whereby a normal yield of solvents may be obtained at all times under commercial operating conditions. The process which we have found to be suitable for rendering bacteria of this class resistant to sluggishness comprises, briefly, effecting a series of subcultivations of the bacteria in question in the presence of the sluggish principle or uutravirus. Whenever sluggishness is first encountered in fermentations with any particular bacteria of this general group, the ultravirus responsible for the condition may be obtained in the form of a Berkefeld filtrate from a mash undergoing sluggish fermentation. The bacteria may then be propagated through a series of subcultivations in contact with this filtrate. We have found that for optimum results the vegetative cells should not be removed prior to each subsequent subcultivation. A suitable method, therefore, comprises transferring the culture during the most active stage of the fermentation and before sporulation takes place. A series of transfers of this type, ranging from four to ten in number, will usually be sufficient to render the culture immune to sluggishness. The completion of the process may be noted by following the yield obtained in fermentations in which the ultravirus is incorporated in the mash. As soon as the culture reaches the stage at which yields are obtained in the presence of the ultravirus equal to the original yields obtained before sluggishness was encountered, the culture may be considered to be immune.

Our invention will now be illustrated by means of specific examples of immunizing procedures as applied to different species of bacteria of the *Clostridium saccharo acetobutylicum* group. This group of bacteria may be defined by the following characteristics:

I. Morphological
   A. Rod-shaped
   B. Spore-forming—Clostridia and Plectridia
   C. Practically indistinguishable from members of the *Clostridium butyricum* group
II. Biochemical
   A. Carbohydrate fermentation
      1. Ability to produce fair yields of butyl alcohol and acetone consistently from starch as the only source of carbohydrate (i. e., corn or other mash containing starch and suitable nutrients)
      2. Ability to produce yields of butyl alcohol and acetone consistently above 30% on the weight of the sugar from 5% sucrose media or the uninverted molasses medium (Medium I) described above
      3. Ability to produce yields of butyl alcohol and acetone consistently above 30% on the weight of the sugar from 5% glucose media with suitable nutrients, or an inverted molasses medium corresponding to Medium I
   B. Nitrogen metabolism
      1. Ability to produce high yields of butyl alcohol and acetone in sugar media containing ammonia as the principal source of nitrogen
      2. Ability to utilize degraded protein (including ammonia) as the sole nitrogen source
      3. Inability to utilize undegraded protein as sole source of nitrogen
      4. Inability to liquefy gelatin or to produce more than slight proteolysis of milk
   C. Oxygen requirements
      1. Anaerobic
   D. Temperature range for solvent production
      1. From 24° C. to 40° C., preferably 29° C. to 30° C.
   E. Hydrogen ion concentration for solvent production
      1. Final pH of 5.0–6.2, preferably 5.4–5.85

*Example I*

A culture of *Clostridium saccharo acetobutylicum* α obtained from a commercial scale fermentation undergoing sluggish fermentation was subjected to a series of subcultivations in a medium of the following composition:

| | Per cent |
|---|---|
| Potato (moist weight) | 30.0 |
| Glucose | 1.0 |
| Calcium carbonate | 0.2 |

A Berkefeld filtrate containing the sluggish principle was obtained from the original mash undergoing sluggish fermentation in the commercial scale fermenter, and 0.5 cc. of this filtrate was added to 15 cc. of the above medium for each transfer. The culture was transferred every twenty-four hours for thirteen consecutive transfers, being incubated at 30° C. between transfers. Periodically, quantitative fermentation tests were made in commercial molasses mashes to determine the degree of immunization secured. For this purpose the culture was heat shocked for two minutes at 98 to 99° C., and transferred to three liters of molasses mash (5.5% sugar concentration containing 0.4% calcium carbonate and 0.23% ammonium sulphate) to which 2 cc. of the filtrate containing the sluggish principle had been added. The following results show the effect of the immunization procedure:

| Number of transfers in contact with filtrate | Solvent yields from molasses mash containing filtrate (percent total solvents based on sugar content of mash) |
|---|---|
| 3d | 16.6 |
| 4th | 18.0 |
| 5th | 18.3 |
| 6th | 32.5 |
| 8th | 31.8 |
| 11th | 30.7 |
| 13th | 30.8 |

These results clearly indicate that after 6 transfers in contact with the filtrate, the culture had become immune to sluggishness.

*Example II*

A culture of *Clostridium saccharo acetobutylicum α* which had not previously encountered sluggishness was immunized by subcultivation in the presence of a filtrate containing the sluggish principle obtained from a separate fermentation in which another culture of the same species of bacteria had encountered sluggish fermentation. The following procedure was employed: A sporulated non-immune culture was inoculated into molasses mash containing 4% sugar, 0.23% ammonium sulphate, and 0.4% calcium carbonate at 90° C., and after two minutes cooled to 30° C. and incubated at this temperature for twenty-four hours. This culture was then transferred to 240 cc. of a nutrient molasses medium of the above type, containing 5% sugar to which 1 cc. of filtrate containing the sluggish principle had been added. Fermentation in this case was found to start very slowly, and reached its maximum point after about 5 days time. At the end of 7 days fermentation was complete, and a transfer was then made into mash containing no filtrate, the mash being maintained at 80 to 90° C. for two minutes prior to cooling to 30° C. for incubation. After twenty-four hours incubation this culture was transferred to 240 cc. of nutrient molasses mash of the type previously described to which 2 cc. of filtrate had been added. After twenty-four hours incubation this culture was transferred to a molasses medium containing no filtrate, in view of the rather slow fermentation encountered in the preceding case. After twenty-four hours incubation this culture was again transferred to mash containing filtrate and fermentation was allowed to proceed to completion. This culture was then transferred to mash containing no filtrate, and was maintained at 80 to 90° C. for two minutes after inoculation before cooling to 30° C. for incubation. After twenty-four hours this culture was again transferred to mash containing filtrate at a concentration of 2 cc. to 240 cc. of mash, and at twenty-four hour periods thereafter for a period of three days the culture was transferred to the same quantity of mash containing 3, 4, and 5 cc. of filtrate, respectively. At the conclusion of this procedure the culture was compared in quantitative fermentation tests with the original non-immune culture with the following results:

| Culture | Filtrate added | Solvent yield at 64 hrs. Percent based on weight of sugar in the mash | Solvent yield at 88 hrs. Percent based on weight of sugar in the mash |
|---|---|---|---|
| Non-immune | No | 29.5 | 32.2. |
| Non-immune | Yes | 0.0 | Fermentation barely started. |
| Immune | Yes | 29.5 | 30.4. |

From the above results it may be seen that in this case 7 transfers in the presence of filtrate containing the sluggish principle secured practically complete immunization of the culture.

*Example III*

The culture of *Clostridium saccharo acetobutylicum γ* which had not previously encountered sluggishness was immunized by isolating an ultravirus to which this particular species was susceptible, and cultivating the bacteria in the presence of this virus in accordance with the method of Example II above. The ultravirus in this case was isolated according to the following procedure: A nutrient molasses mash was inoculated with an active culture of bacteria, and some river water (not sterilized) was added and the resulting mash was incubated for twenty-four hours. The mash was then passed through a Berkefeld filter, and 10% of the filtrate thus obtained was added to a similar quantity of molasses mash which was then inoculated with the original non-immune culture and incubated for twenty-four hours, this cycle being repeated until a filtrate was obtained which was highly toxic to a fresh non-immune culture. This filtrate was then utilized in the immunization processes described in Example II above.

It will be noted that the above example illustrates a modification of the procedure in that according to this method it is unnecessary to wait for an epidemic of sluggishness to break out before immunizing the culture. A specific ultravirus, to which any particular species of bacteria is susceptible, may often be isolated in this manner from natural sources, such as soil or water, or even air. The isolation procedure described will be found to be effective if the ultravirus in question is present in the sample of material utilized, but, of course, this will not always be the case. If a number of samples fail to yield the specific ultravirus, it may be preferable to utilize the non-immune culture and subsequently carry out the immunization process if an epidemic of sluggishness is encountered in plant operation.

It is to be definitely understood, of course, that the above examples are illustrative only and that our invention is not limited to the particular types of bacteria or procedures described. As previously pointed out, our invention is applicable to all butyl alcohol producing bacteria of the class which consistently produce higher yields of solvents in nutrient glucose mashes than from mashes consisting solely of grain meal and water, and which produce increasing amounts of acidic end products in the absence of hydrogen ion control. It will be evident to those skilled in the art that the procedures described in the above examples may be modified in numerous respects without departing from the spirit of our invention. For example, although optimum yields are obtained when employing a procedure in which subcultivations are effected without removing vegetative forms of the bacteria prior to each succeeding transfer, for certain purposes it may be desirable to allow each subculture to proceed to the spore state and to remove the attenuated vegetative forms prior to succeeding transfers. Likewise, the particular method of subculturing may be varied in numerous respects and any type of nutrient mash which is readily fermentable by the bacteria in question may be employed for this purpose. The subcultivations may suitably be effected on solid media if adequate precautions are taken to secure intimate contact of the bacteria with a sufficient quantity of the ultravirus. Likewise, in place of utilizing a Berkefeld filtrate from a sluggish fermentation as a source of the ultravirus, any portion of a sluggishly fermenting mash may be utilized to introduce the virus as long as such portion of the mash is obtained without treatment which would destroy or attenuate the virus. The whole mash may be utilized for this purpose, although it is preferred to pass it through a bacterial filter to avoid possible contamination of the culture. In general, it may be said that any equivalents or modifications of procedure which would be obvious to one skilled in the art may be employed without departing from the scope of our invention.

Our invention now having been described, what we claim is:

1. A process for immunizing a culture of butyl alcohol producing bacteria of the class which are capable of producing consistently higher yields of solvents from nutrient glucose mashes than from mashes consisting solely of grain meal and water, and which are susceptible to sluggishness, which comprises repeatedly subcultivating said bacteria in the presence of sluggishly fermenting mash in which bacteria having an identical combination of identifying characteristics are undergoing sluggish fermentation.

2. A process for immunizing a culture of butyl alcohol producing bacteria of the class which are capable of producing consistently higher yields of solvents from nutrient glucose mashes than from mashes consisting solely of grain meal and water, and which are susceptible to sluggishness which comprises repeatedly subcultivating said bacteria in the presence of a portion of a Berkefeld filtrate from a mash in which bacteria having an identical combination of identifying characteristics are undergoing sluggish fermentation.

3. A process for immunizing a culture of butyl alcohol producing bacteria of the class which are capable of producing consistently higher yields of solvents from nutrient glucose mashes than from mashes consisting solely of grain meal and water, and which are susceptible to sluggishness which comprises repeatedly subcultivating said bacteria in the presence of sluggishly fermenting mash in which bacteria having an identical combination of identifying characteristics are undergoing sluggish fermentation, at least a portion of said subcultivations being effected by transfer of the bacteria in the vegetative state.

4. A process for immunizing a culture of butyl alcohol producing bacteria of the class which are capable of producing consistently higher yields of solvents from nutrient glucose mashes than from mashes consisting solely of grain meal and water, and which are susceptible to sluggishness which comprises repeatedly subcultivating said bacteria in the presence of a portion of a Berkefeld filtrate from a mash in which bacteria having an identical combination of identifying characteristics are undergoing sluggish fermentation, at least a portion of said subcultivations being effected by transfer of the bacteria in the vegetative state.

5. A process for immunizing a culture of butyl alcohol producing bacteria of the class which are capable of producing consistently higher yields of solvents from nutrient glucose mashes than from mashes consisting solely of grain meal and water, and which are susceptible to sluggishness which comprises repeatedly subcultivating said bacteria in the presence of sluggishly fermenting mash in which bacteria having an identical combination of identifying characteristics are undergoing sluggish fermentation, the said subcultivations being effected by the transfer of bacteria in the vegetative state.

6. A process for immunizing a culture of butyl alcohol producing bacteria of the class which are capable of producing consistently higher yields of solvents from nutrient glucose mashes than from mashes consisting solely of grain meal and water, and which are susceptible to sluggishness which comprises repeatedly subcultivating said bacteria in the presence of a portion of a Berkefeld filtrate from a mash in which bacteria having an identical combination of identifying characteristics are undergoing sluggish fermentation, the said subcultivations being effected by the transfer of bacteria in the vegetative state.

7. In a process for the production of butyl alcohol from fermentable carbohydrate mashes chosen from the class consisting of nutrient starch mashes and nutrient sugar mashes by means of butyl alcohol producing bacteria of the type which are capable of producing consistently higher yields of solvents from nutrient glucose mashes then from mashes consisting solely of grain meal and water, the improvement which comprises subjecting the mash to the action of a culture of said bacteria which is immune to sluggishness.

8. In a process for the production of butyl alcohol from fermentable carbohydrate mashes chosen from the class consisting of nutrient starch mashes and nutrient sugar mashes by means of butyl alcohol producing bacteria of the type which are capable of producing consistently higher yields of solvents from nutrient glucose mashes than from mashes consisting solely of grain meal and water, the improvement which comprises subjecting the mash to the action of a culture of said bacteria which has previously been repeatedly subcultivated in the presence of sluggishly fermenting mash in which bacteria having an identical combination of identifying characteristics are undergoing sluggish fermentation.

9. In a process for the production of butyl alcohol from fermentable carbohydrate mashes chosen from the class consisting of nutrient starch mashes and nutrient sugar mashes by means of butyl alcohol producing bacteria of the type which are capable of producing consistently higher yields of solvents from nutrient glucose mashes than from mashes consisting solely of grain meal and water, the improvement which comprises subjecting the mash to the action of a culture of said bacteria which has previously been repeatedly subcultivated in the presence of a portion of a Berkefeld filtrate from a mash in which bacteria having an identical combination of identifying characteristics are undergoing sluggish fermentation.

DAVID A. LEGG.
MILFORD T. WALTON.